UNITED STATES PATENT OFFICE.

WALTER C. SMITH, OF CHROME, NEW JERSEY, ASSIGNOR TO UNITED STATES METALS REFINING COMPANY, OF CHROME, NEW JERSEY, A CORPORATION OF NEW JERSEY.

METHOD OF TREATING IMPURE BISMUTH METAL.

1,166,721.  Specification of Letters Patent.  Patented Jan. 4, 1916.

No Drawing.   Application filed May 12, 1914.   Serial No. 838,167.

*To all whom it may concern:*

Be it known that I, WALTER C. SMITH, a citizen of the United States, residing at Chrome, in the county of Middlesex and State of New Jersey, have invented certain new and useful Improvements in Methods of Treating Impure Bismuth Metal; and I do hereby declare the following to be a full, clear, and exact description of the invention, such as will enable others skilled in the art to which it appertains to make and use the same.

The invention relates to a method or process of treating bismuth bearing ores or metallurgical products containing bismuth for the recovery of the metallic bismuth contained therein.

The object of the invention is to provide a novel and improved method or process which will enable a high percentage of the bismuth contained in the materials treated to be recovered, more economically, and of greater purity than heretofore.

To this end the invention consists in the method or process, and the steps and sub-methods comprising combinations of two or more of the steps of the process, hereinafter described.

The bismuth bearing material is first reduced to metal and concentrated by any suitable metallurgical method. The impure bismuth metal thus obtained may contain various kinds of impurities, and the method of treating the metal which is best suited to recover the bismuth in the desired state of purity may vary with the impurities present and the extent to which the purification is to be carried. The complete method or process which is adapted for the economical elimination of all the impurities which are likely to be present in any bismuth metal comprises four principal steps or methods of treatment which may be performed in any desired order. If certain impurities are not present in the bismuth which is to be treated, then one or more of the steps may be omitted with advantage, and the purification of the metal be completed or carried to the desired extent by the other step or steps or methods of treatment. In treating the bismuth metal with the four steps or methods of treatment comprising the complete process, certain impurities may be completely or partially removed by the first treatment which would also be completely or partially removed by one of the subsequent treatments if present in the metal being treated. In such case the removal of certain impurities may be effected fractionally by the successive treatments, and the different steps may be combined to secure that fractional removal of the impurities which is the most efficient and economical.

In further explaining the invention, reference will first be made to each of the four steps or methods of treatment, and its effect on the bismuth metal, under the assumption that the metal has not been previously treated by any of the other steps or methods of treatment.

In accordance with one of the steps or methods of treatment, sulfur is added to the metal while the metal is in a molten condition, and the metal is preferably agitated to bring the sulfur in contact with the various impurities which are distributed through the molten material. The sulfur may be in the form of native sulfur, brimstone, flowers of sulfur, sulfids, or a mixture of sulfates and carbon. The effect of the treatment with sulfur is to separate nearly all of the copper, the greater proportion of the tellurium, silver, arsenic, antimony, selenium and zinc, some of the tin, and a fair proportion of the lead which may be present in the metal. None of the gold is removed by this treatment. The impurities specified unite with the sulfur and form a sort of matte which is a combination of the metals with the sulfur as sulfids. This matte floats on the surface of the molten metal and may be skimmed off. The removal of the impurities is more effectively done by lowering the temperature of the molten metal, after the addition of the sulfur, to a temperature of about 515° to 520° F. This treatment may be repeated until by test the bismuth is shown to be substantially free from the impurities which are acted upon by the sulfur, or the sulfur treatment may be relied upon to secure only a fractional removal of the impurities or some of them, and the complete or further removal of these impurities be effected by subsequent treatment of the metal by one or more of the other steps of the complete process.

In accordance with another step or method of treatment, caustic soda or other suitable alkali is added to the bismuth metal while the metal is in a molten condition. The alkali may be brought into contact with the impurities throughout the molten mass by stirring or agitating the molten metal preferably by the use of steam. The caustic soda or other alkali acts upon the tellurium, selenium, sulfur, arsenic, antimony, tin and zinc which may be present in the metal, forming sodium compounds which float on the surface of the metal, and may be removed from the purified metal by skimming or other means. The operation may be repeated until by test the metal shows the removal of substantially all of the impurities referred to, or the alkali treatment may be utilized to perfect a fractional removal of the impurities, or to substantially complete the removal of impurities which have been fractionally removed by other treatment.

In accordance with another step or method of treatment, zinc is dissolved in the bismuth metal while it is in a molten condition, and the molten bath is preferably thoroughly stirred. The zinc unites with the tellurium, copper, old silver, selenium, arsenic, antimony and tin which may be in the metal to form alloys which float upon the surface of the metal and may be removed. The separation of the zinc alloys is facilitated by lowering the temperature of the molten bath to about 550° F. after the zinc has been completely dissolved and thoroughly stirred into the molten bath. The lowering of the temperature does not remove all of the zinc, but the quantity which remains may not be detrimental to the quality of the bismuth for certain uses to which it may be put. If it is desired, however, to produce a bismuth which is free from zinc, the temperature of the bath may be raised, and the zinc may be eliminated by treating the molten bath with caustic soda or other alkali. This method of treatment may also be utilized to remove substantially all the impurities enumerated, or may be used in combination with the other steps of the process in securing a fractional removal of the impurities when by such treatment the impurities may be more economically removed.

In accordance with another step or method of treatment, the impure bismuth metal is brought into a molten condition, and then the temperature is lowered until crystallization of the bismuth begins. The action of crystallization is to separate pure or substantially pure bismuth as crystals from the impurities which remain in solution. The molten metal is kept at such a temperature that the crystallization continues, and during the crystallization the metal may be stirred with air, steam or other means, and the purity of the crystals benefitted thereby. This action is a partial separation, since the molten liquid which remains after the crystals have been removed is a mixture of bismuth and the impurities, while the crystals may be substantially pure bismuth.

After one batch of crystals has been removed, the crystallization may be allowed to proceed further, and another batch of crystals removed. During these successive operations the crystals become less pure, while the impurity of the molten remaining portions increases through the concentration of the impurities in the mass. The impure crystals may be further purified, or the bismuth removed from the impure residue, by treatment in accordance with any or all of the steps or methods of treatment previously mentioned.

The advantage of utilizing the process comprising the four steps or methods of treatment enumerated in effecting a fractional and successive separation of the impurities may best be explained by considering the process in connection with the treatment of an impure bismuth metal containing substantially all the impurities enumerated. In explaining this treatment it will be assumed that the steps are performed in the order in which they have been referred to, although it will be understood, as already stated, that this order is not essential, and is selected for the purpose of explanation.

After the treatment with sulfur, and removal of the impurities separated thereby in the manner above described, the bismuth metal will be practically free from copper, may contain a part of the tellurium and a somewhat greater proportion of the lead, a small proportion of the silver and sulfur, all the gold, and will be practically free from antimony and arsenic. The subsequent treatment with caustic soda will remove the remaining tellurium and sulfur and slightly reduce the amount of lead. The silver and gold will be unaffected. The treatment with zinc will not affect the lead, will further reduce the silver, and will remove substantially all the gold. The remaining lead, and practically all the remaining silver and any gold which may remain after the zinc treatment, will be removed by the crystallization.

If the impure bismuth metal did not carry any lead, the step of crystallization might be omitted with advantage, the treatment with zinc being carried further, or until practically all the gold and silver had been removed. If there is lead present, however, the zinc treatment may be stopped before all the gold and silver are removed, since they will be removed with the lead in the crystallization treatment. This is referred to as an example of conditions under which a sub-process or part of the complete process may be used with advantage.

Other modifications in the process, or in the steps or methods of treatment to which the metal is subjected, may be made in accordance with the impurities of character of the metal to be treated.

While, as above explained, the order in which the steps or methods of treatment are performed may be varied as found desirable without departing from the invention. the treatment with caustic soda or other alkali should precede the zincing treatment when the impure metals contain sulfur, tellurium or selenium, since these elements require a large amount of zinc to be used before the zinc alloys with the gold and silver, thus increasing the cost of treatment.

Having explained the nature and object of the invention, and specifically described the manner in which it may be practised, what is claimed is:—

1. The method of treating impure bismuth metal or metals containing a high percentage of bismuth, comprising subjecting the molten metal to the action of sulfur and removing the impurities separated thereby, subjecting the molten metal to the action of an alkali as caustic soda and removing the impurities separated thereby, dissolving zinc in the molten metal and removing the impurities separated thereby, bringing the metal to a molten condition, then lowering the temperature until crystallization begins, and removing the crystals of purified bismuth thus formed.

2. The method of treating impure bismuth metal or metals containing a high percentage of bismuth consisting in subjecting the molten metal to the action of sulfur and removing the impurities separated thereby, subjecting the molten metal to the action of an alkali and removing the impurities separated thereby, dissolving zinc in the molten metal and removing the impurities separated thereby, bringing the metal to a molten condition and treating with an alkali and removing the impurities separated thereby, then lowering the temperature of the molten mass until crystallization takes place, and removing the crystals of purified bismuth thus formed.

3. The method of treating impure bismuth metal or metals containing a high percentage of bismuth, consisting in subjecting the molten metal to the action of an alkali and removing the impurities separated thereby.

4. The method of treating a high percentage bismuth metal carrying impurities of copper, lead, tellurium, silver, gold, arsenic and antimony, etc., comprising melting the metal, treating with sulfur and skimming to eliminate the greater portion of the arsenic, antimony and copper, maintaining the residue in a molten state, treating with caustic soda and skimming to eliminate the tellurium, arsenic, antimony and sulfur remaining from the prior treatment, maintaining the resulting residue in a molten state, dissolving zinc therein, cooling and skimming to eliminate copper, gold and silver, melting the gold-free residue, treating with caustic soda and skimming to eliminate any remaining zinc and melting and then cooling the residue to crystallize the substantially free bismuth and separate it from the lead.

5. The method of treating impure bismuth metal or metals containing a high percentage of bismuth, consisting in bringing the metal to a molten condition, lowering the temperature until the material begins to crystallize, and removing from the molten mixture the crystals of bismuth so formed.

6. The method of treating impure bismuth metal or metals containing a high percentage of bismuth, consisting in subjecting the molten metal to the action of caustic soda and removing the impurities separated thereby.

7. The method of treating a high percentage bismuth metal carrying impurities of tellurium, selenium, sulfur, zinc, etc., comprising melting the metal, treating with caustic soda, mixing the treated mass with superheated steam and skimming the mixed mass to remove sodium compounds of the tellurium, sulfur, selenium and zinc carried by the impure metal.

8. The method of treating impure bismuth metal or metals containing a high percentage of bismuth, comprising dissolving zinc in the molten metal, removing the alloys formed between the zinc and the impurities in the metal, and subjecting the bismuth metal thus purified to the action of an alkali as caustic soda to remove the unalloyed zinc.

9. The method of treating impure bismuth metal or metals containing a high percentage of bismuth, consisting in subjecting the molten metal to the action of sulfur, removing the impurities separated thereby, subjecting the molten metal to the action of an alkali as caustic soda, and removing the impurities separated thereby.

10. The method of treating impure bismuth metal or metals containing a high percentage of bismuth, consisting in subjecting the molten metal to the action of sulfur, removing the impurities separated thereby, dissolving zinc in the molten metal, and removing the alloys formed between the zinc and the impurities in the molten metal.

11. The method of treating impure bismuth metal or metals containing a high percentage of bismuth, consisting in subjecting the molten metal to the action of sulfur, removing the impurities separated thereby, bringing the metal to a molten condition, lowering the temperature until the material begins to crystallize, and removing from the molten mixture the bismuth crystals so formed.

12. The method of treating impure bismuth metal or metals containing a high percentage of bismuth, consisting in subjecting the molten metal to the action of an alkali as caustic soda, removing the impurities separated thereby, dissolving zinc in the molten metal, and removing the alloys formed between the zinc and the impurities in the molten metal.

13. The method of treating impure bismuth metal or metals containing a high percentage of bismuth, consisting in subjecting the molten impure metal to the action of an alkali as caustic soda, removing the impurities separated thereby, bringing the metal to a molten condition, lowering the temperature until the material begins to crystallize, and removing the bismuth crystals so formed.

14. The method of treating impure bismuth metal or metals containing a high percentage of bismuth, consisting in dissolving zinc in the molten metal, removing the alloys formed between the zinc and the impurities in the metal, bringing the metal to a molten condition, lowering the temperature until the material begins to crystallize, and removing the bismuth crystals so formed.

15. The method of treating impure bismuth metal or metals containing a high percentage of bismuth, consisting in subjecting the molten metal to the action of sulfur, removing the impurities separated thereby, subjecting the molten metal to the action of an alkali as caustic soda, removing the impurities separated thereby, dissolving zinc in the molten metal, and removing the alloys formed between the zinc and the impurities in the molten metal.

16. The method of treating impure bismuth metal or metals containing a high percentage of bismuth, consisting in subjecting the molten metal to the action of sulfur, removing the impurities separated thereby, subjecting the molten metal to the action of an alkali as caustic soda, removing the impurities separated thereby, bringing the metal to a molten condition, lowering the temperature until the material begins to crystallize, and removing the crystals of bismuth so formed.

17. The method of treating impure bismuth metal or metals containing a high percentage of bismuth, consisting in subjecting the molten metal to the action of sulfur, removing the impurities separated thereby, dissolving zinc in the molten metal, removing the alloys formed between the zinc and impurities in the metal, bringing the metal to a molten condition, lowering the temperature until the material begins to crystallize, and removing the bismuth crystals so formed.

18. The method of treating impure bismuth metal or metals containing a high percentage of bismuth, consisting in subjecting the molten metal to the action of an alkali as caustic soda, removing the impurities separated thereby, dissolving zinc in the molten metal, removing the alloys formed between the zinc and impurities in the metal, bringing the metal to a molten condition, lowering the temperature until the material begins to crystallize, and removing the bismuth crystals so formed.

WALTER C. SMITH.

Witnesses:
GRACE FITCH SMITH,
J. E. HASLAM.

It is hereby certified that in Letters Patent No. 1,166,721, granted January 4, 1916, upon the application of Walter C. Smith, of Chrome, New Jersey, for an improvement in "Methods of Treating Impure Bismuth Metal," errors appear in the printed specification requiring correction as follows: Page 2, line 23, strike out the word "old" and insert the word *gold* and a comma; same page, line 128, for the word "of," first occurrence, read *or;* and that the said Letters Patent should be read with these corrections therein that the same may conform to the record of the case in the Patent Office.

Signed and sealed this 1st day of February, A. D., 1916.

[SEAL.]

J. T. NEWTON,
*Acting Commissioner of Patents.*

Cl. 75-17